United States Patent [19]

Sullivan

[11] Patent Number: 5,325,276
[45] Date of Patent: Jun. 28, 1994

[54] LIGHTING APPARATUS FOR THE COMPUTER IMAGING OF A SURFACE

[75] Inventor: Kevin Sullivan, Waterbury, Conn.

[73] Assignee: United Parcel Service of America, Inc., Atlanta, Ga.

[21] Appl. No.: 942,960

[22] Filed: Sep. 10, 1992

[51] Int. Cl.[5] .............................................. F21V 9/16
[52] U.S. Cl. ...................................... 362/84; 362/223; 362/246; 362/301
[58] Field of Search ................... 362/84, 301, 310, 246, 362/247, 223

[56] References Cited

U.S. PATENT DOCUMENTS

| | | | |
|---|---|---|---|
| 2,001,378 | 5/1935 | Cornwall | 362/223 |
| 2,213,868 | 9/1940 | Lucian | 362/84 |
| 2,308,009 | 1/1943 | Hood et al. | 362/347 |
| 2,490,370 | 12/1949 | Neuwirth | 362/223 |
| 2,951,611 | 9/1960 | Tillson et al. | 362/223 |
| 3,158,330 | 11/1964 | Steenhoven | 362/223 |
| 3,202,813 | 8/1965 | Weinstein | 362/223 |
| 3,216,317 | 11/1965 | Nail . | |
| 3,317,722 | 5/1967 | Whitney | 362/223 |
| 3,344,269 | 9/1967 | Brown | 362/84 |
| 3,675,641 | 7/1972 | Flore | 128/6 |
| 3,996,476 | 12/1976 | Lazzara . | |
| 4,138,620 | 2/1979 | Dickson | 362/84 |
| 4,210,133 | 7/1980 | Castaneda | 128/6 |
| 4,335,302 | 6/1982 | Robillard . | |
| 4,488,679 | 12/1984 | Bockholt et al. . | |
| 4,500,776 | 2/1985 | Laser | 235/102 |
| 4,603,976 | 8/1986 | Fetzer et al. . | |
| 4,737,653 | 4/1988 | Nakagawa et al. . | |
| 4,739,159 | 4/1988 | Inokuchi . | |
| 4,766,300 | 8/1988 | Chadima, Jr. et al. | 235/472 |
| 4,818,847 | 4/1989 | Hara et al. . | |
| 4,877,949 | 10/1989 | Danielson et al. | 235/462 |
| 4,947,291 | 8/1990 | McDermott . | |
| 5,019,699 | 5/1991 | Koenck . | |
| 5,027,418 | 6/1991 | Ikegaya et al. . | |
| 5,032,960 | 7/1991 | Katoh . | |
| 5,046,159 | 9/1991 | Hamanaka . | |
| 5,081,343 | 1/1992 | Chadima, Jr. et al. . | |

FOREIGN PATENT DOCUMENTS

| | | |
|---|---|---|
| 0405965 | 1/1991 | European Pat. Off. . |
| 0524029 | 1/1993 | European Pat. Off. ...... G06K 7/10 |
| 1252108 | 11/1971 | United Kingdom . |

Primary Examiner—Carroll B. Dority
Attorney, Agent, or Firm—James A. Drobile; William H. Murray; Robert E. Rosenthal

[57] ABSTRACT

An improved lighting apparatus for providing uniform illumination to the surface of an object, primarily surfaces with data in code or alphanumeric format, includes an area diffused light source mounted interior to a light-shielding canopy. The area diffused light source includes at least one electroluminiscent panel. The light-shielding canopy blocks out external sources of light, and has an interior surface that reflects light emitted by the electroluminiscent panel. In operation, the light-shielding canopy completely covers the surface of an object while diffuse, uniform light emanating directly from the electroluminiscent panel or reflected off the interior surface of the light-shielding canopy illuminates the surface of the object.

4 Claims, 4 Drawing Sheets

LIGHTING APPARATUS FOR THE COMPUTER IMAGING OF A SURFACE

BACKGROUND OF THE INVENTION

This invention relates to a lighting apparatus for the computer imaging or optical scanning of a surface, particularly a surface having information contained thereon in either a code or alphanumeric format, and in particular, to a lighting apparatus having a lighting source disposed in a light-shielding canopy.

Computer imaging/optical scanning devices were developed to electronically recreate an image of the surface of an object. The electronic image is created by holding the imaging/scanning device directly over the surface to be imaged/scanned. Typically, appropriate lensing focuses the image on a CCD array. The image on the surface is then converted to an electronic signal. Electronic image information is then stored or transmitted to an appropriate data processing apparatus.

To expedite the processing of routine information, computer imaging/optical scanning devices are used to retrieve data or information printed on or affixed to the surface of an object in code or alphanumeric format. A common example is a bar code label affixed to the surface of a package. The bar code label contains information about the package's origin, destination, order number, and the like. To retrieve the information from the bar code label, a computer imaging/optical scanning device electronically recreates a digitized image of the bar code label and transfers that image to a processing computer. The processing computer then deciphers the desired information from the digitized image. Computer imaging/optical scanning devices can be either machine mounted or hand-held. Portable hand-held devices are especially useful when processing is required at remote locations.

The ability to retrieve data or information from the surface of an object depends largely on the quality of the digital image obtained by the computer imaging/optical scanning device. Glare, shadows, non-uniformity in illumination, and interference by ambient light on the surface during the imaging/scanning process can result in degradation of the digital image. A poor digital image leads to loss of data. Uniform illumination over an area is especially important when reading information on an alphanumeric label or in a two-dimensional encoded format. For example, it may be desired to obtain an electronic image of an address label for transmission to optical character recognition devices.

Known computer imaging/optical scanning devices seek to reduce non-uniformity in illumination by using an internal light source to illuminate the surface under review while blocking or masking out interference from ambient light. Such devices, as represented by the patents discussed below, use point light sources in a variety of wavelengths to illuminate the surface to be imaged/scanned. The patents discussed below also disclose the use of a shroud over the surface to block out external light, or the use of light sensors which detect light only in the wavelength generated by the point light source, thereby masking out ambient light during the imaging/scanning process.

Examples of these various computer imaging/optical scanning devices include U.S. Pat. No. 3,996,476 entitled "Low Noise Photoelectric Detector Apparatus," issued to Lazarra on Dec. 7, 1976; U.S. Pat. No. 4,737,653 entitled "Image Sensor with Auxiliary Light Source," issued to Nakagawa, et al. on Apr. 12, 1988; U.S. Pat. No. 4,488,679 entitled "Code and Reading System, " issued to Bockholt, et al. on Dec. 18, 1984; U.S. Pat. No. 4,818,847 entitled "Apparatus for Optically Reading Printed Information" issued to Hara, et al. on Apr. 4, 1989; and U.S. Pat. No. 5,027,418 entitled "Electro-Optical Inspection Apparatus for Printed-Circuit Boards with Components Mounted Thereon," issued to Ikegaya, et al. on Jun. 25, 1991. These patents all disclose the use of point light sources to illuminate the surface to be imaged or scanned. Only U.S. Pat. No. 4,488,679 discloses the use of an exterior enclosure to block out ambient light.

Point light sources, however, do not provide uniform illumination across a surface. Because of their radiation pattern, point light sources can frequently produce glare and/or shadows on the surface resulting in loss of data during the computer imaging/optical scanning process. Furthermore, only U.S. Pat. No. 4,488,679 discloses the use of an exterior hood to prevent ambient light from interfering with the illumination provided by the point light sources.

Accordingly, it is an object of this invention to provide a computer imaging/optical scanning device that provides uniform illumination of the surface to be imaged or scanned.

Further objects and advantages of the invention will become apparent from the detailed description of a preferred embodiment set forth below.

SUMMARY OF THE INVENTION

An apparatus for illuminating a surface includes means for shielding the surface from sources of light external to the shielding means, and means, comprising an area diffused light source, for illuminating the surface, the illuminating means being disposed interior to the shielding means.

DETAILED DESCRIPTION OF A PREFERRED EMBODIMENT

Figure 1:
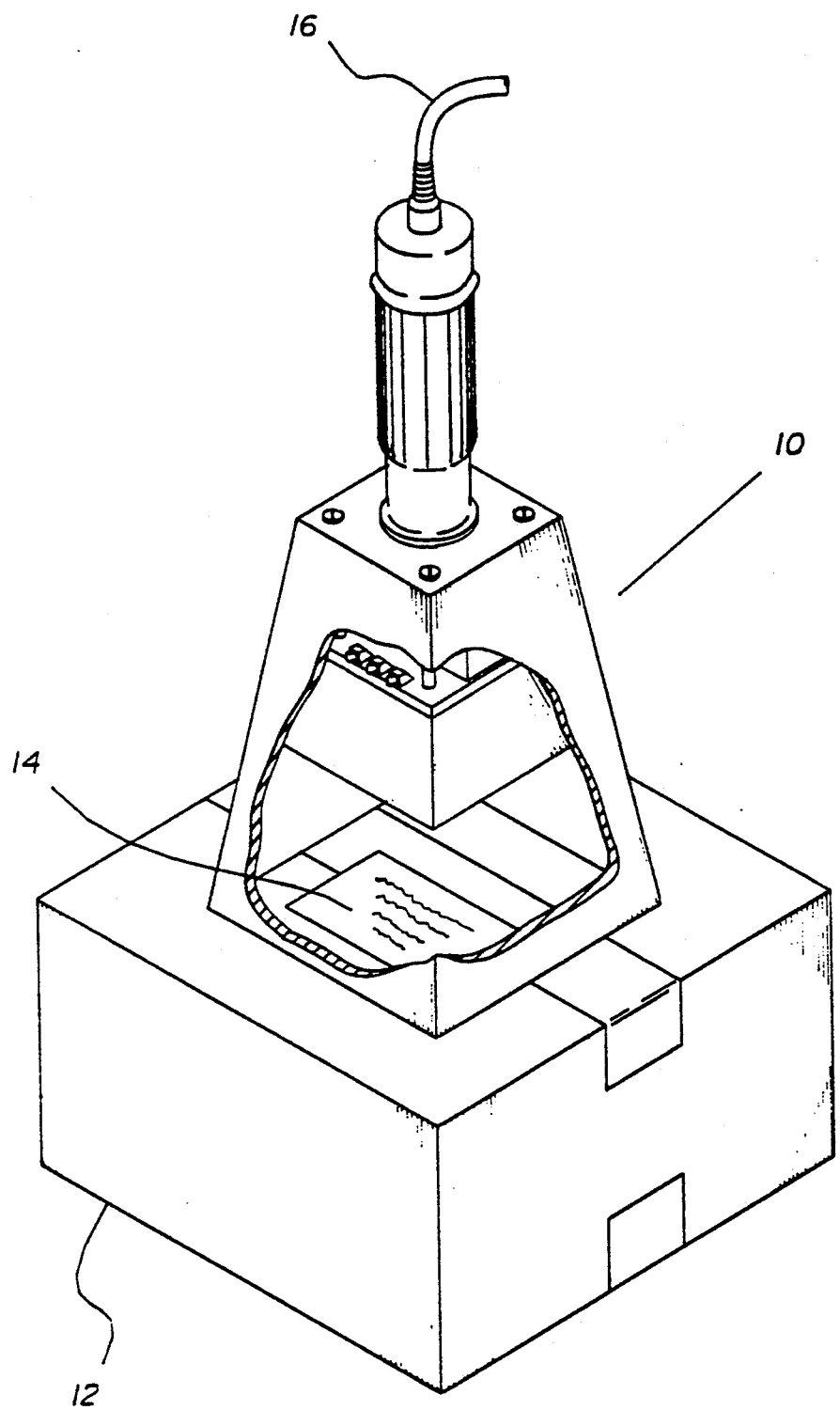
FIG. 1 is a perspective view with partial cut-away of an apparatus according to the invention in use.

Referring to FIG. 1, there is shown an improved lighting apparatus 10 according to the invention in partial cut-away, in use. Apparatus 10 is shown in use in obtaining an image of label 14 affixed to a surface of package 12. Apparatus 10 is placed on the surface of package 12. Apparatus 10 is positioned so as to completely cover label 14. Diffuse light generated by apparatus 10 uniformly illuminates label 14 while label 14 is imaged by a camera assembly disposed inside apparatus 10. An electronic signal representing the image of label 14 obtained by the camera assembly is then transmitted from apparatus 10 to a processing computer (not shown) external to apparatus 10 through cable 16.

Figure 2:
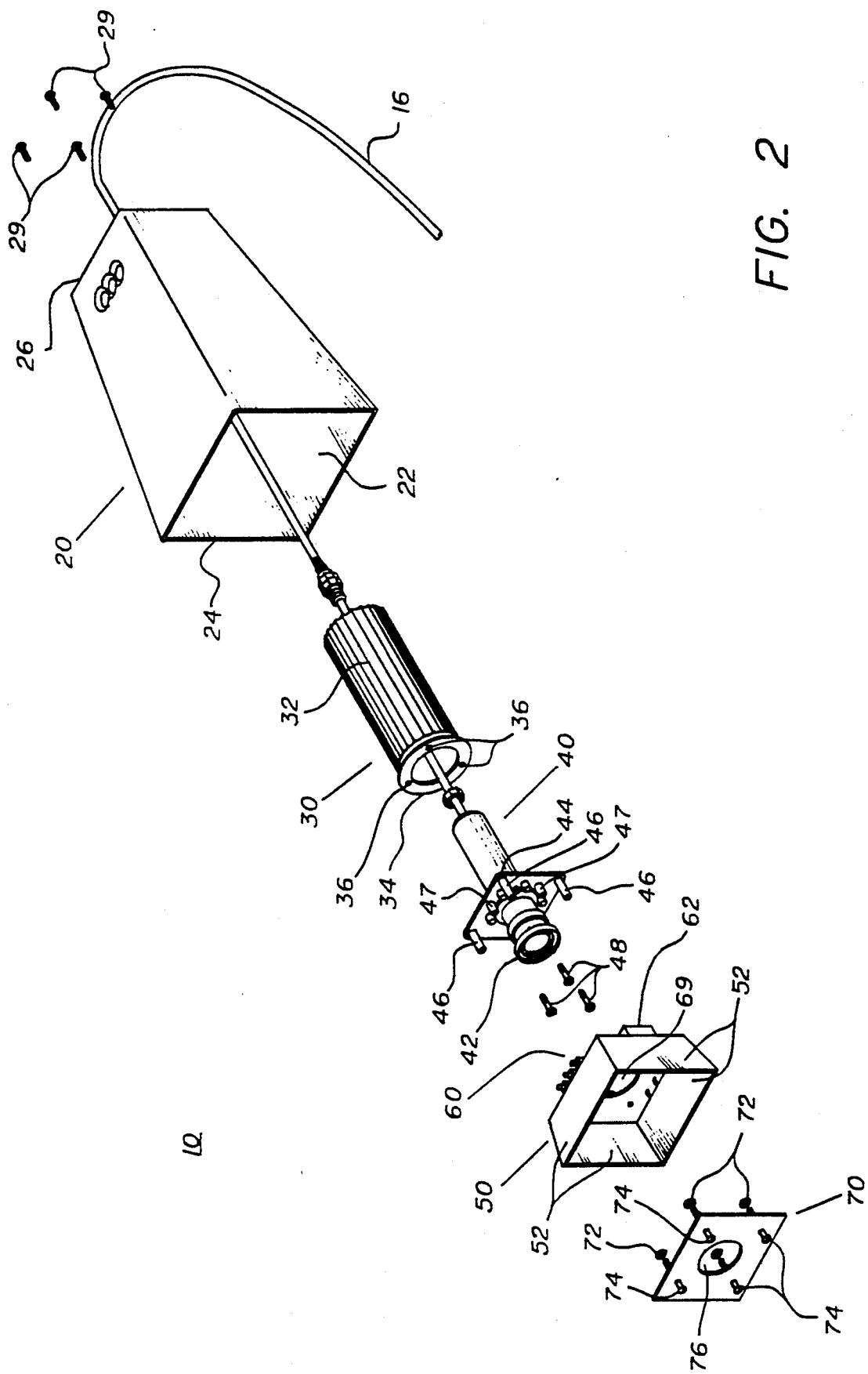
FIG. 2 is an exploded perspective view of an apparatus according to the invention.

Referring to FIG. 2, there is shown an exploded perspective view of improved lighting apparatus 10 according to the invention. Apparatus 10 includes light-shielding canopy 20, handle assembly 30, camera assembly 40, area diffused light source 50 and mounting plate 70.

Light-shielding canopy 20 has three distinct functions. The first function is to shield the interior of apparatus 10 from interference by light sources external to apparatus 10. The second function is to reflect diffuse light generated inside apparatus 10 by the area diffused light source 50 onto the surface to be imaged. The third function is to act as a mounting base for the internal components of apparatus 10.

Light-shielding canopy 20 is substantially in the shape of the frustum of a pyramid, with the four sides of the frustum defined by the walls 22 of canopy 20, the base of the frustum defined by open base 24 of canopy 20, and the truncated top of the frustum defined by the top 26 of canopy 20. It will be understood, however, that light-shielding canopy 20 may have other configurations within the scope of the invention.

The walls 22 of light-shielding canopy 20 are made of an opaque material which does not permit light penetration. Specifically, walls 22 must be opaque to light in the wavelengths detected by the camera assembly. For example, canopy 20 may be of aluminum or thinly rolled sheet steel. The lower edges of walls 22 of canopy 20 are substantially coplanar. As a result, when apparatus 10 is placed on a flat surface, such as package 12 depicted in FIG. 1, the interior of canopy 20, including the surface to be imaged, will be shielded from substantially all sources of light external to canopy 20. Base 24 is open so that light emitted by light source 50 will illuminate the surface to be imaged, such as label 14 depicted in FIG. 1, and so that light reflected from the surface will be received by camera assembly 40. In addition, base 24 is open to allow for the insertion of the assembled interior components of apparatus 10, namely, handle assembly 30, camera assembly 40, area diffused light source 50 and mounting plate 70.

Figure 3:
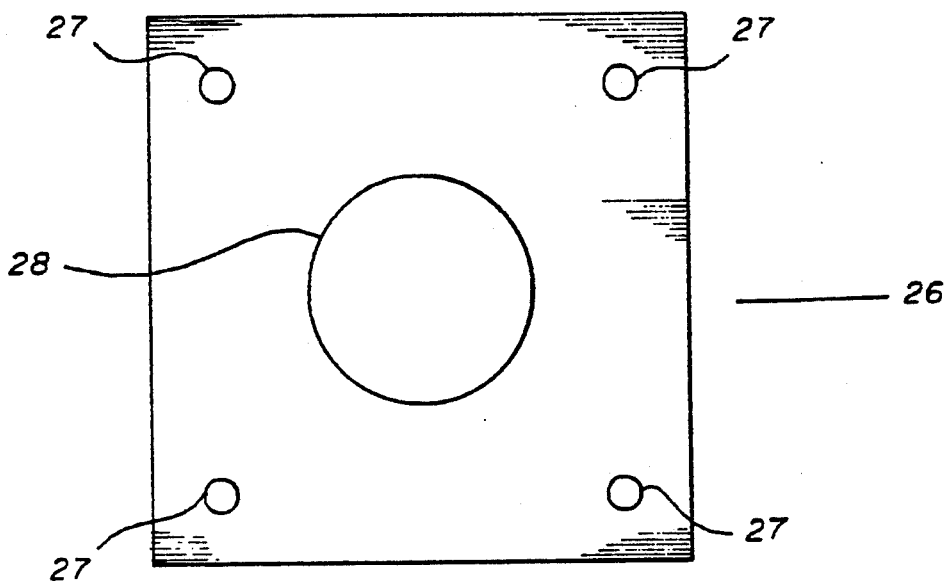
FIG. 3 is a plan view of a top surface of a canopy in an apparatus according to the invention.

Referring to FIG. 3, the top 26 of light-shielding canopy 20 is also made of an opaque material which does not permit light penetration. The top 26 has four screw holes 27 which penetrate the top 26 and a central circular hole 28 which is large enough to accommodate the circumference of handle 32 of handle assembly 30.

Referring again to FIG. 2, the four walls 22 of light-shielding canopy 20 may be made of a single sheet of opaque material, or of four separate sheets of opaque material attached lengthwise along their angled edges using appropriate conventional bonding means, such as gluing or welding. The top 26 is attached to the top edges of the four walls 22 using appropriate conventional bonding means, such as gluing or welding. The interior surface of each wall 22 is reflective of light emitted by panels 22. Depending on the particular application of apparatus 10, walls 22 are provided with either specular light-reflective surface quality or diffuse light-reflective surface quality. Specular light-reflective surface quality is obtained by applying a mirror-like finish, such as a thin glass sheeting, directly onto the interior surface of each wall 22. Alternatively, the interior surface of each wall 22 may be polished to obtain high reflectivity, or the material of which canopy 20 is made may be intrinsically light-reflective. Light-diffusing surface quality is obtained by applying a light-diffusing coating, such as a thin frosted glass sheeting or flat white paint, directly onto the interior surface of each wall 22, or by specially treating the material of which canopy 20 is made to increase its light-diffusing properties.

Handle assembly 30 is used to grip apparatus 10 during operation and also serves as a mounting base for camera assembly 40. When apparatus 10 is fully assembled, handle 32 of handle assembly 30 protrudes through central circular hole 28 in the top 26 of light-shielding canopy 20. Handle 32 therefore extends outwardly from light-shielding canopy 20, allowing an operator to hold apparatus 10 with one hand. Handle assembly 30 also has a circular plate 34 that serves as a mounting base for camera assembly 40. Handle assembly 30 is hollow to accommodate cable 16 therein. Cable 16 is provided to transmit electronic image information from camera assembly 40 to a processing computer (not shown) external to apparatus 10.

Camera assembly 40 includes a camera body 41, camera lens 42 and face plate 44 with mounting threaded cylindrical bores 46 and 47. During operation of apparatus 10, camera assembly 40 electronically images the portion of the surface interior to canopy 20 and transfers that electronic image via cable 16 to a processing computer (not shown) external to apparatus 10. Camera assembly 40 is mounted to handle assembly 30 by attaching face plate 44 to circular plate 34. As the camera is not part of the illumination apparatus of the invention, the camera will not be described in detail.

Area diffused light source 50 illuminates the surface to be imaged with diffuse light of uniform intensity emitted directly by light source 50 or emitted by light source 50 and reflected off the interior walls 22 of light-shielding canopy 20. In a preferred embodiment, light source 50 includes four planar electroluminiscent panels 52 attached to a printed circuit board 60.

Figure 4:
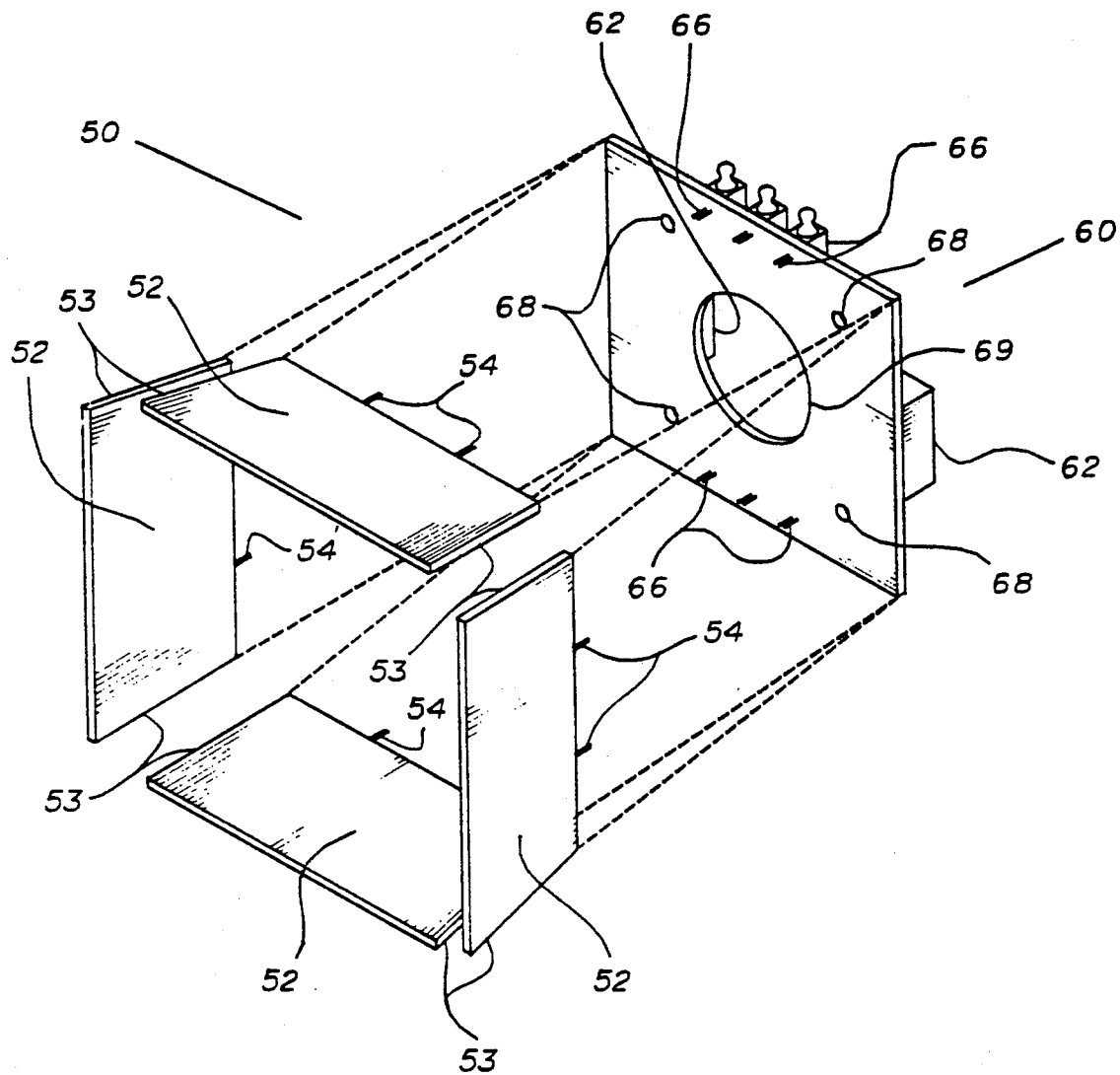
FIG. 4 is an exploded perspective view of a light source in an apparatus according to the invention.

An exploded perspective view of area diffused light source 50 is provided in FIG. 4. In a preferred embodiment, light source 50 is substantially in the shape of the frustum of a pyramid, with four planar electroluminiscent panels 52 comprising the walls of light source 50, the base of each electroluminiscent panel 52 comprising the open base of light source 50, and a printed circuit board 60 comprising the truncated top of light source 50. It will be understood, however, that light source 50 may have other configurations within the scope of the invention.

Figure 5:
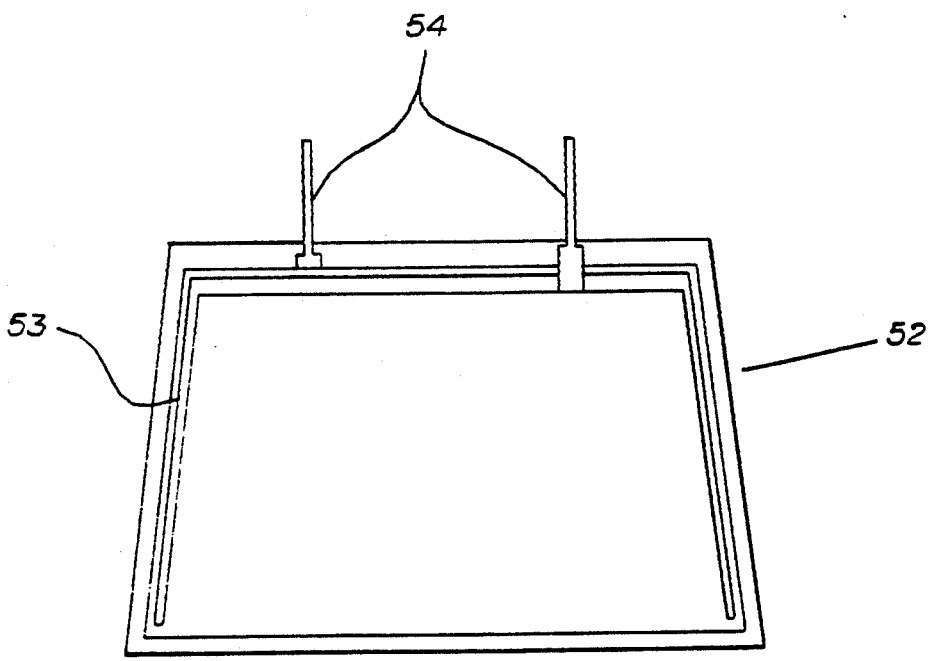
FIG. 5 is a side view of an electroluminiscent panel of a light source of an apparatus according to the invention.

As shown in FIG. 5, each electroluminiscent panel 52 of light source 50 is substantially in the shape of a trapezoid having parallel top and bottom edges. The dimensions of panel 52 may be selected depending on the intensity of illumination desired. In one preferred embodiment, the top edge of each panel 52 is approximately 2.8 inches long; the bottom edge of each panel 52 is approximately 3.3 inches long; both angled edges 53 of each panel 52 are approximately 2.0 inches long; and each panel 52 is approximately 0.035 inches in depth. Panels having those dimensions have been found to provide satisfactory illumination over a surface approximately five inches by six inches in area.

Each panel 52 has two exposed solder leads 54 extending from its top edge. Solder leads 54 serve physically to connect panels 52 to printed circuit board 60 and to provide an electrical connection between circuit board 60 and panels 52. Each solder lead 54 may be, for example, approximately 0.5 inches long and may be located approximately 0.65 inches from an adjacent top corner of panel 52.

Referring again to FIG. 4, printed circuit board 60 serves as a mounting base for electroluminiscent panels 52 and for appropriate electronic components that provide electrical power to panels 52. It will be understood that, within the scope of this invention, other structures may be provided for physical support of panels and associated electrical components.

For additional structural stability, panels 52 are physically attached to the bottom edges of circuit board 60. Panels 52 may be glued, by appropriate conventional adhesive, to the bottom of circuit board 60. The angled edges 53 of each panel 52 are aligned so that each angled edge 53 of each panel 52 is in contact with an angled edge 53 of an adjacent panel 52. The panels 52 may be adhesively bonded to one another by gluing each panel 52 to the adjacent panel 52 where their respective angled edges 53 meet.

Circuit board 60 has electrical contacts (not shown) on the surface to receive electrical power from an external power source (not shown) via wires (not shown) which are preferably disposed in cable 16. Electrical contacts (not shown) also receive actuation and other associated signals from an external processing computer (not shown) via appropriate data lines that are run through cable 16. Appropriate conventional circuitry is provided on circuit board 60 to connect electrical contacts (not shown) to inputs of DC inverters 62. Circuit board 60 has connecting holes 66 therethrough for receiving solder leads 54 of panels 52. Solder leads 54 are received in connecting holes 66 and soldered in place to circuit board 60. Hardwire circuitry may be provided on circuit board 60 to provide an electrical connection between the output of DC inverters 62 and connecting holes 66, thereby supplying AC electrical power to panels 52 through solder leads 54.

When AC electrical power is supplied to panels 52 through DC inverters 62, connecting holes 66 and solder leads 54, panels 52 emit light from substantially all of their inner surfaces. The intensity of illumination generated by panels 52 corresponds directly to the voltage applied. It will be understood that an appropriate power supply conversion apparatus may be provided without being mounted on a printed circuit board. However, printed circuit board 60 is advantageous in that panels 52, as well as necessary electronic hardware, may be mounted thereon. Circuit board 60 has four mounting screw holes 68 which penetrate circuit board 60, the function of which is described below in this detailed description. A central circular hole 69 large enough to accommodate the camera lens 42 of camera assembly 40 is also provided in circuit board 60.

Two alternative control schemes may be provided for control of the electrical power supplied to panels 52. The first alternative control scheme provides uninterrupted electrical power to panels 52 employing the power supply circuitry described above. Panels 52 therefore remain continuously illuminated during all phases of the imaging/scanning process.

The second alternative control scheme provides current to panels 52 during the imaging process only. Once the improved lighting apparatus 10 is positioned over the surface to be imaged, an operator pushes a mechanical switch (not shown) external to apparatus 10. Pushing the mechanical switch causes a signal to be transmitted to circuit board 60 via appropriate conventional data lines. Appropriate conventional circuitry, which may be mounted on the surface of circuit board 60, provide electrical power to panels 52 in response to the signal. In addition, a timing circuit is provided which is triggered by the signal. The timing circuit may be hardwired to transmit an imaging start signal to a processing computer after a selected period of time, which period is sufficiently long to allow panels 52 to reach steady state illumination. Once the imaging start signal is received by the processing computer, the processing computer initiates imaging of the surface using camera assembly 40. Once imaging is complete, the processing computer sends a signal to circuit board 60 to interrupt electrical power to panels 52 until the next imaging sequence.

There may also be provided means for varying the input voltage supplied to panels 52 to regulate the intensity of light emitted by panels 52. Such voltage control means could include a manual voltage control mechanism. For example, a pin diode could be mounted on circuit board 60 and electrically connected so as to control directly the amount of electrical power supplied to panels 52. Alternatively, the voltage control means could include an automatic light sensitive feedback mechanism to measure the intensity of light at the imaging surface, and automatically adjust the amount of electrical power supplied to panels 52 so that the light intensity at the imaging surface is maintained at a predetermined level.

Referring now to FIG. 2, camera assembly 40, area diffused light source 50 and mounting plate 70 are mounted interior of light-shielding canopy 20. Mounting plate 70 serves to absorb the force of impact on apparatus 10, thereby reducing the risk of damage to light source 50. Mounting plate 70 is disposed interior to light source 50, adjacent to the bottom surface of circuit board 60 and spaced downward from circuit board 60 by spacers 72. Light source 50 is attached to camera assembly 40 by conventional fasteners, such as screws 74, disposed through mounting plate 70 and holes 68 in circuit board 60. Mounting plate 70 has a central circular hole 76 which is the same size as central circular hole 69 in circuit board 60. Central hole 76 is aligned with central circular hole 69 when mounting plate 70 is disposed in light source 50. Central hole 76 is sufficiently large to accommodate the camera lens 42 of camera assembly 40.

Light source 50 is attached to camera assembly 40 by disposing conventional fasteners, such as screws 74, through mounting plate 70, spacers 72, and holes 68 in printed circuit board 60, and into bores 46 in face plate 44 of camera assembly 40. Camera lens 42 of camera assembly 40 is disposed interior to light source 50 through central circular hole 69 in circuit board 60 and central circular hole 76 in mounting plate 70.

Camera assembly 40 is attached to handle assembly 50 by conventional fasteners, such as screws 48, disposed through bores 47 in face plate 44 and into holes 36 on circular plate 34 of handle assembly 30. Handle 32 of handle assembly 30 is disposed through the central circular hole 28 in the top 26 of light-shielding canopy 20. Canopy 20 is attached to camera assembly 40, area diffused light source 50 and mounting plate 60 by conventional fasteners, such as screws 29, disposed through holes 27 in the top 26 of canopy 20 and into the backside of bores 46 on face plate 44 of camera assembly 40.

It will be appreciated that there are considerable variations that can be accomplished in a method and apparatus of the invention without departing from its scope. As a result, although a preferred embodiment of an apparatus of the invention has been described above, it is emphasized that the invention is not limited to a preferred embodiment and there exist other alternative embodiments that are fully encompassed within the invention's scope, which is intended to be limited only by the scope of the appended claims.

What is claimed is:

1. An apparatus for illuminating a surface, comprising:
   (a) means for shielding the surface from sources of light external to the shielding means, and
   (b) means, comprising an area diffused light source, for illuminating the surface, said illuminating means being disposed interior to said shielding mans, wherein the area diffused light source comprises at least a first pair of opposed planar electroluminescent panels arranged substantially in the form of two side walls of a frustum of a pyramid, the top edges of the panels defining the truncated top of the frustum, the bottom edges of the panel defining the base of the frustum, and the illuminating surfaces of the panels being provided on the interior walls of the frustum.

2. An apparatus for illuminating a surface comprising an area diffused light source comprising at least a first pair of opposed electroluminescent panels arranged substantially in the form of two side walls of a frustum of a pyramid, with the top edges of the panels defining the truncated top of the frustum, the bottom edges of the panels defining the base of the frustum, and the illuminating surfaces of the panels being provided on the interior walls of the frustum, said area diffused light source mounted interior to a light-shielding canopy disposed substantially in the shape of a frustum of a pyramid, an opening defined in the base of the light-shielding canopy to allow the surface to be illuminated by the area diffused light source and scanned by light-sensing means, any exposed interior surface of said light-shielding canopy being dispersive of light generated by the electroluminescent panels and said canopy being adapted to shield said surface from sources of light external to said canopy.

3. An apparatus as recited in claim 1, wherein said area diffused light source further comprises a second pair of opposed planar electroluminescent panels.

4. An apparatus as recited in claim 2, wherein said area diffused light source further comprises a second pair of opposed electroluminescent panels.

* * * * *

UNITED STATES PATENT AND TRADEMARK OFFICE
CERTIFICATE OF CORRECTION

PATENT NO. : 5,325,276
DATED : June 28, 1994
INVENTOR(S) : Kevin Sullivan

It is certified that error appears in the above-indentified patent and that said Letters Patent is hereby corrected as shown below:

Abstract, line 9, delete "electroluminiscent" and insert therefor --electroluminescent--.

Abstract, line 12, delete "electroluminiscent" and insert therefor --electroluminescent--.

Column 7, line 14, delete "mans," and insert therefor --means,--.

Signed and Sealed this

Twelfth Day of September, 1995

Attest:

BRUCE LEHMAN

*Attesting Officer*  *Commissioner of Patents and Trademarks*